US011821399B2

(12) United States Patent
Inokuchi et al.

(10) Patent No.: US 11,821,399 B2
(45) Date of Patent: Nov. 21, 2023

(54) VEHICLE REMOTE ENGINE OPERATION WITH AMBIENT SITUATION DETECTION

(71) Applicant: TOYOTA JIDOSHA KABUSHIKI KAISHA, Aichi-ken (JP)

(72) Inventors: Takaaki Inokuchi, Nagoya (JP); Tatsunori Katoh, Nagoya (JP); Tsutomu Miyazaki, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/725,556

(22) Filed: Apr. 21, 2022

(65) Prior Publication Data

US 2022/0397086 A1    Dec. 15, 2022

(30) Foreign Application Priority Data

Jun. 10, 2021 (JP) ................................. 2021-097365

(51) Int. Cl.
*F02N 11/08* (2006.01)

(52) U.S. Cl.
CPC ...... *F02N 11/0807* (2013.01); *F02N 2200/10* (2013.01); *F02N 2200/12* (2013.01)

(58) Field of Classification Search
CPC .......................... F02N 11/0807; F02N 2200/12
USPC ..................................................... 123/179.2
See application file for complete search history.

(56) References Cited

U.S. PATENT DOCUMENTS

| 7,650,864 B2 * | 1/2010 | Hassan | F02N 11/0807 340/901 |
| 8,479,706 B2 * | 7/2013 | Speers | F02M 3/00 123/339.14 |
| 8,626,356 B2 * | 1/2014 | Davis | F02N 11/0807 701/2 |
| 8,827,171 B2 * | 9/2014 | Choi | B60H 1/00778 236/51 |
| 9,403,417 B2 * | 8/2016 | Proefke | B60H 1/00657 |
| 9,975,400 B2 * | 5/2018 | Farooq | B60H 1/00778 |
| 9,994,175 B2 * | 6/2018 | Maeshiro | B60R 16/037 |
| 10,023,024 B2 * | 7/2018 | Carlesimo | B60H 1/00657 |
| 11,248,576 B2 * | 2/2022 | Crawford | E05F 15/668 |
| 2003/0027548 A1 * | 2/2003 | Wisnia | B60R 25/04 455/404.1 |
| 2006/0068973 A1 * | 3/2006 | Kappauf | B60R 25/24 477/107 |
| 2008/0068208 A1 * | 3/2008 | Hanselman | G08C 17/02 307/10.6 |

(Continued)

FOREIGN PATENT DOCUMENTS

JP    2016-183568 A    10/2016

*Primary Examiner* — Phutthiwat Wongwian
*Assistant Examiner* — Arnold Castro
(74) *Attorney, Agent, or Firm* — HAUPTMAN HAM, LLP

(57) ABSTRACT

In a case where an engine is started based on a remote operation, a limitation condition for limiting an engine start is tightened or a stop condition after the engine is started is relaxed, as compared to a case where the engine is started based on a switch operation in an occupant cabin. That is, it is difficult to start the engine when the engine is started based on the remote operation, and it is easy to stop the engine when the engine is started based on the remote operation. As a result, it is possible to take more appropriate measures when the engine is started based on the remote operation.

3 Claims, 4 Drawing Sheets

(56) References Cited

U.S. PATENT DOCUMENTS

| | | | |
|---|---|---|---|
| 2008/0117079 A1* | 5/2008 | Hassan | F02N 11/101 340/901 |
| 2011/0030638 A1* | 2/2011 | Newman | B60R 25/04 340/5.71 |
| 2011/0030639 A1* | 2/2011 | Kwiecinski | F02N 11/101 123/179.2 |
| 2011/0032115 A1* | 2/2011 | Kwiecinski | F02N 11/101 340/5.71 |
| 2016/0001631 A1* | 1/2016 | Geissenhoener | F02N 11/0807 123/179.3 |
| 2018/0045159 A1* | 2/2018 | Patel | F02N 11/0807 |
| 2018/0126849 A1* | 5/2018 | Kanagaraj | F02N 11/00 |

* cited by examiner

VEHICLE REMOTE ENGINE OPERATION WITH AMBIENT SITUATION DETECTION

CROSS-REFERENCE TO RELATED APPLICATION

This application claims priority to Japanese Patent Application No. 2021-097365 filed on Jun. 10, 2021, incorporated herein by reference in its entirety.

BACKGROUND

1. Technical Field

The present disclosure relates to a vehicle, and more particularly to a vehicle that can start an engine based on a remote operation.

2. Description of Related Art

In the related art, as such a type of vehicle, a vehicle provided with an engine, vehicle cabin concentration detection means for detecting a carbon monoxide concentration in a vehicle cabin, and ambient situation detection means for detecting an ambient situation of the vehicle has been proposed (see, for example, Japanese Unexamined Patent Application Publication No. 2016-183568 (JP 2016-183568 A)). In this vehicle, when a determination is made that a detection value from the vehicle cabin concentration detection means is larger than a reference value and the vehicle is a closed space by a detection value from the ambient situation detection means, the engine is stopped and a notification of a warning is given. As a result, an occupant is notified that the carbon monoxide concentration in the vehicle cabin is high, and a further increase in the carbon monoxide concentration in the vehicle cabin is suppressed.

SUMMARY

In recent years, a vehicle has been proposed in which an engine is started by a remote operation to warm up the engine or execute air conditioning of a vehicle cabin. There is no problem in an engine start by the remote operation when the vehicle is parked outdoors, but when the vehicle is parked indoors, a good environmental state indoors or in the vehicle cabin may not be maintained due to the exhaust. Therefore, in a case where the engine is started by the remote operation, it is needed to execute a process different from a process in a case where the engine is started by getting on the vehicle.

A vehicle according to an aspect of the present disclosure is to take more appropriate measures when an engine is started based on a remote operation.

The vehicle of the aspect of the present disclosure employs the following means.

An aspect of the present disclosure relates to a vehicle including an engine, and a controller. The controller is configured to start the engine based on a remote operation. The controller is configured to set a stricter limitation condition for limiting an engine start or a looser stop condition for stopping the engine after the engine is started in a case where the engine is started based on the remote operation, as compared to a case where the engine is started based on a switch operation in an occupant cabin.

In the vehicle according to the aspect of the present disclosure, in a case where the engine is started based on the remote operation, the limitation condition for limiting the engine start is stricter or the stop condition for stopping the engine after the engine is started is looser, as compared to a case where the engine is started based on the switch operation in the occupant cabin. That is, it is difficult to start the engine when the engine is started based on the remote operation, and it is easy to stop the engine when the engine is started based on the remote operation. As a result, it is possible to further reduce the risk when the engine is started based on the remote operation. As a result, it is possible to take more appropriate measures when the engine is started based on the remote operation.

In the vehicle according to the aspect of the present disclosure, the controller may be configured to give a warning that the vehicle is parked indoors in a case where a determination is made that the vehicle is parked indoors when the engine is started based on the remote operation. In this way, it is possible to notify a remote operator that the vehicle is parked indoors.

In the vehicle according to the aspect of the present disclosure, the controller may be configured to prohibit the engine start in a case where a determination is made that the vehicle is parked indoors when the engine is started based on the remote operation. In this way, it is possible to suppress the deterioration of the environment indoors or in the occupant cabin due to exhaust.

Further, in the vehicle according to the aspect of the present disclosure, the controller may be configured to stop the engine in a case where a determination is made that the vehicle is parked indoors after the engine is started based on the remote operation. In this way, it is possible to suppress the deterioration of the environment indoors or in the occupant cabin due to exhaust.

The vehicle according to the aspect of the present disclosure may further include an ambient situation detector configured to detect an ambient situation of the vehicle, in which the controller is configured to determine whether or not the vehicle is parked indoors based on a detection result of the ambient situation detector.

In the vehicle according to the aspect of the present disclosure, the controller may be configured to stop the engine in a case where presence of a person around the vehicle is detected while the engine is operated based on the remote operation. In this way, it is possible to suppress the influence of the exhaust on the person around the vehicle. In this case, the controller may be configured to determine whether or not the person is present around the vehicle based on voice recognition or contact recognition with the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the following, a mode for carrying out the present disclosure will be described with an embodiment.

Figure 1:
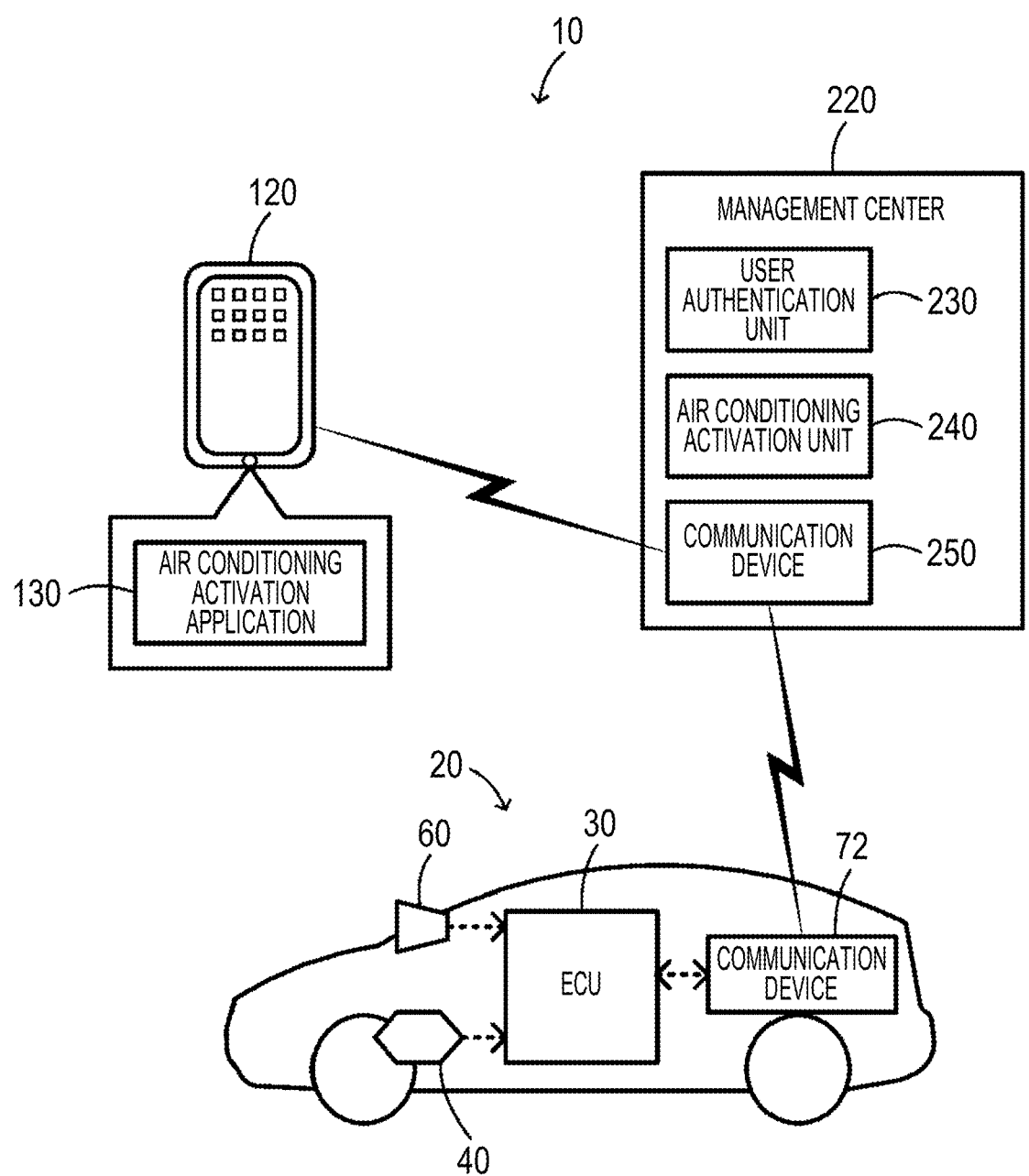
FIG. 1 is a configuration diagram showing an outline of a configuration of an information management system 10 having a vehicle 20 as an embodiment of the present disclosure.
Figure 2:
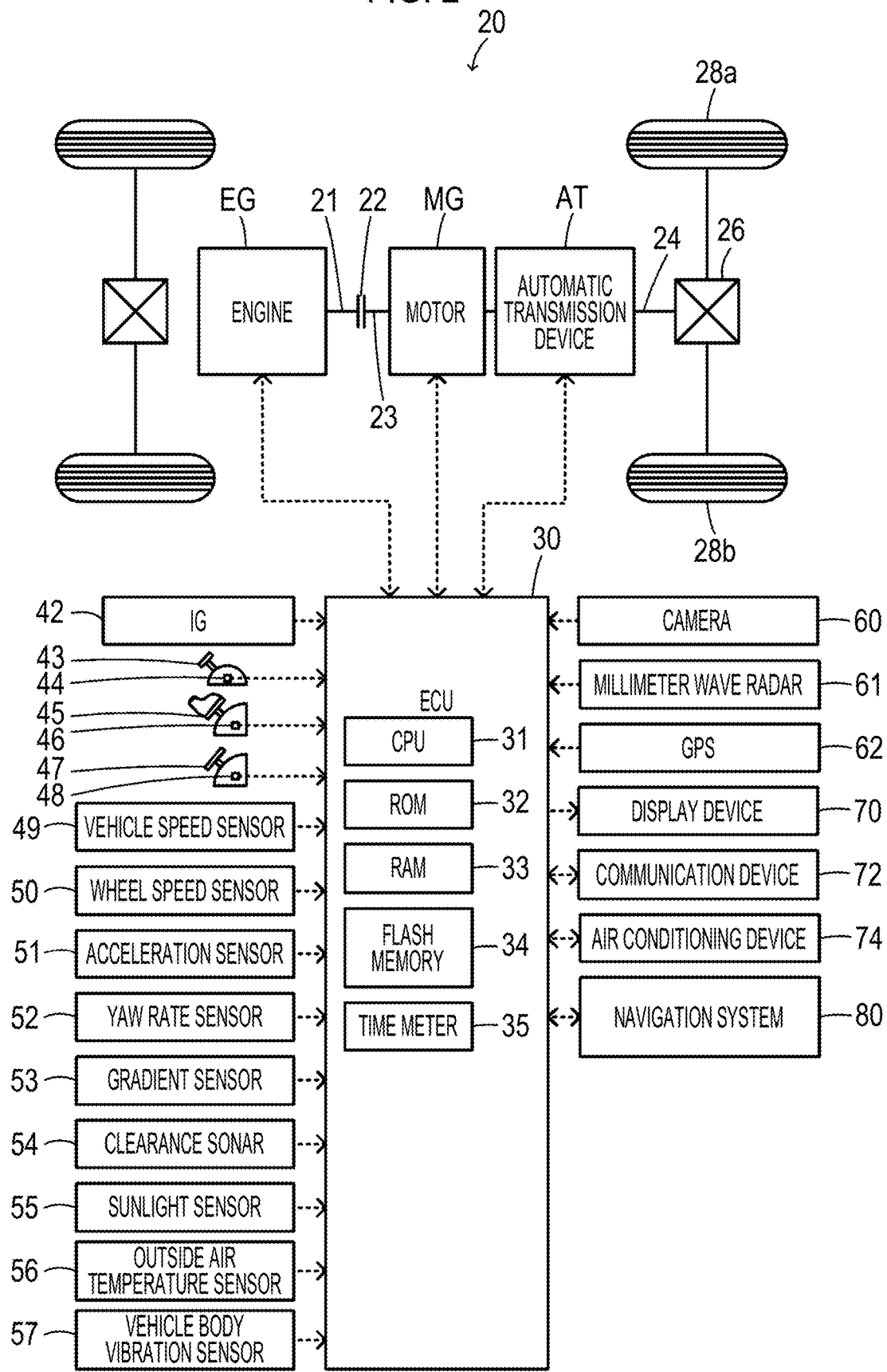
FIG. 2 is a configuration diagram showing an outline of a configuration of the vehicle 20 according to the embodiment.

FIG. 1 is a configuration diagram showing an outline of a configuration of an information management system 10 having a vehicle 20 as the embodiment of the present disclosure, and FIG. 2 is a configuration diagram showing an outline of a configuration of the vehicle 20 according to the embodiment. As shown in FIG. 1, the information management system 10 according to the embodiment includes the vehicle 20, a portable terminal 120, and a management center 220.

The vehicle 20 includes, as shown in FIG. 2, an engine EG, a motor MG, and an automatic transmission device AT. The engine EG is configured as an internal combustion engine driven by using a hydrocarbon-based fuel, such as gasoline or light oil, and an output shaft 21 of the engine EG is connected to an input shaft 23 of the automatic transmission device AT via a clutch 22. The motor MG is configured as, for example, a synchronous motor generator, and a rotor of the motor MG is connected to the input shaft 23 of the automatic transmission device AT. The motor MG is driven by converting direct current power from a battery (not shown) into three-phase alternating current power by an inverter (not shown) and applying the converted current power. The automatic transmission device AT is configured as, for example, a hydraulically driven transmission having six forward gears and one reverse gear and including a torque converter and the automatic transmission, and a drive shaft 24 as the output shaft of the automatic transmission device AT is connected to drive wheels 28a, 28b via a differential gear 26.

The vehicle 20 includes various sensors 40, a camera 60, a millimeter wave radar 61, a global positioning system (GPS) 62, a display device 70, a communication device 72, an air conditioning device 74 that executes air conditioning of the occupant cabin, a navigation system 80, or an electronic control unit 30.

Examples of the various sensors 40 include sensors that detect a state of the vehicle or an ambient situation, such as a vehicle speed sensor 49, a wheel speed sensor 50, an acceleration sensor 51, a yaw rate sensor 52, a gradient sensor 53, a clearance sonar 54, a sunlight sensor 55, an outside air temperature sensor 56, or a vehicle body vibration sensor 57.

A plurality of the cameras 60 is disposed such that a front, a rear, or a side of the vehicle can be imaged. The camera 60 may have a function as a drive recorder that stores, for example, a vehicle speed, global positioning system (GPS) data, and a time together with the captured image. The communication device 72 communicates with the management center 220 via a wireless communication network, or receives various information via the Internet. The air conditioning device 74 executes the air conditioning in the vehicle cabin.

The navigation system 80 is a system that guides own vehicle to a set destination, and includes a map information database or a display unit (not shown). The map information database stores, as map information, a road surface pavement state of a road in each section, a width of the road, the number of lanes, a width of a sidewalk, a direction in which the vehicle can travel, a legal speed, or the like. When the destination is set, the navigation system 80 sets a route and executes route guide based on information on the destination, information on a current location (current position of own vehicle) acquired by the GPS 62, and information stored in the map information database.

The electronic control unit 30 is a microcomputer configured with a CPU 31 as a center, and includes, in addition to the CPU 31, a ROM 32 that stores a program and the like, a RAM 33 that transitorily stores data, a flash memory 34 that stores data and the like, a time meter 35 having a timer function and the like, or an input and output port (not shown).

Signals from the various sensors are input to the electronic control unit 30 via the input port. Examples of the signals input to the electronic control unit 30 via the input port include an ignition signal from an ignition switch 42, a shift position from a shift position sensor 44 that detects a position of a shift lever 43, an accelerator operation amount from an accelerator pedal position sensor 46 that detects a stepping amount of an accelerator pedal 45, and a brake position from a brake pedal position sensor 48 that detects a stepping amount of a brake pedal 47. In addition, examples of the signals input to the electronic control unit 30 via the input port also include a vehicle speed from the vehicle speed sensor 49, a wheel speed from the wheel speed sensor 50, acceleration from the acceleration sensor 51, a yaw rate from the yaw rate sensor 52, a road surface gradient from the gradient sensor 53, proximity information from the clearance sonar 54, sunlight information from the sunlight sensor 55, an outside air temperature from the outside air temperature sensor 56, vehicle body vibration information from the vehicle body vibration sensor 57, radar information from the millimeter wave radar 61, and GPS data (positional information) from the GPS 62. Further, examples of the signals input to the electronic control unit 30 via the input port also include signals indicating a state of the engine EG from various sensors attached to the engine EG.

The electronic control unit 30 outputs various control signals via the output port. Examples of the control signals output from the electronic control unit 30 via the output port include a display control signal to the display device 70, a communication control signal to the communication device 72, and an air conditioning control signal to the air conditioning device 74. In addition, examples of the control signals output from the electronic control unit 30 via the output port also include control signals, such as a throttle control signal for controlling the operation of the engine EG, a fuel injection control signal, and an ignition control signal.

The portable terminal 120 is configured as, for example, a smartphone having a microcomputer function and a telephone function. An air conditioning activation application 130 as application software for executing the air conditioning in the occupant cabin of the vehicle 20 by the remote operation is installed in the portable terminal 120, and the portable terminal 120 communicates with the management center 220 via a communication network, such as the Internet or the telephone line, by the process by the air conditioning activation application 130.

The management center 220 includes a user authentication unit 230, an air conditioning activation unit 240, or a communication device 250. The user authentication unit 230 executes authentication that the user is a user of the vehicle 20 with the air conditioning activation application 130 of the portable terminal 120. The authentication can be executed by receiving an identification (ID) code and a password input and transmitted from the portable terminal 120, and determining whether or not an identification (ID) code or a password stored in advance match the identification code of the vehicle 20 and the like. The air conditioning activation unit 240 communicates information needed for controlling driving of the air conditioning device 74 or the engine EG of the vehicle 20 by the remote operation with the air conditioning activation application 130 of the portable terminal 120 or the electronic control unit 30 of the vehicle 20 via the communication device 250.

In the following, an operation of the information management system 10 configured as described above, particularly an operation of the vehicle 20 when the engine EG is started by the remote operation, and an operation after the engine EG is started by the remote operation will be described. First, the operation of the vehicle 20 when the engine EG is started by the remote operation will be described, and then the operation after the engine EG is started by the remote operation will be described.

Figure 3:
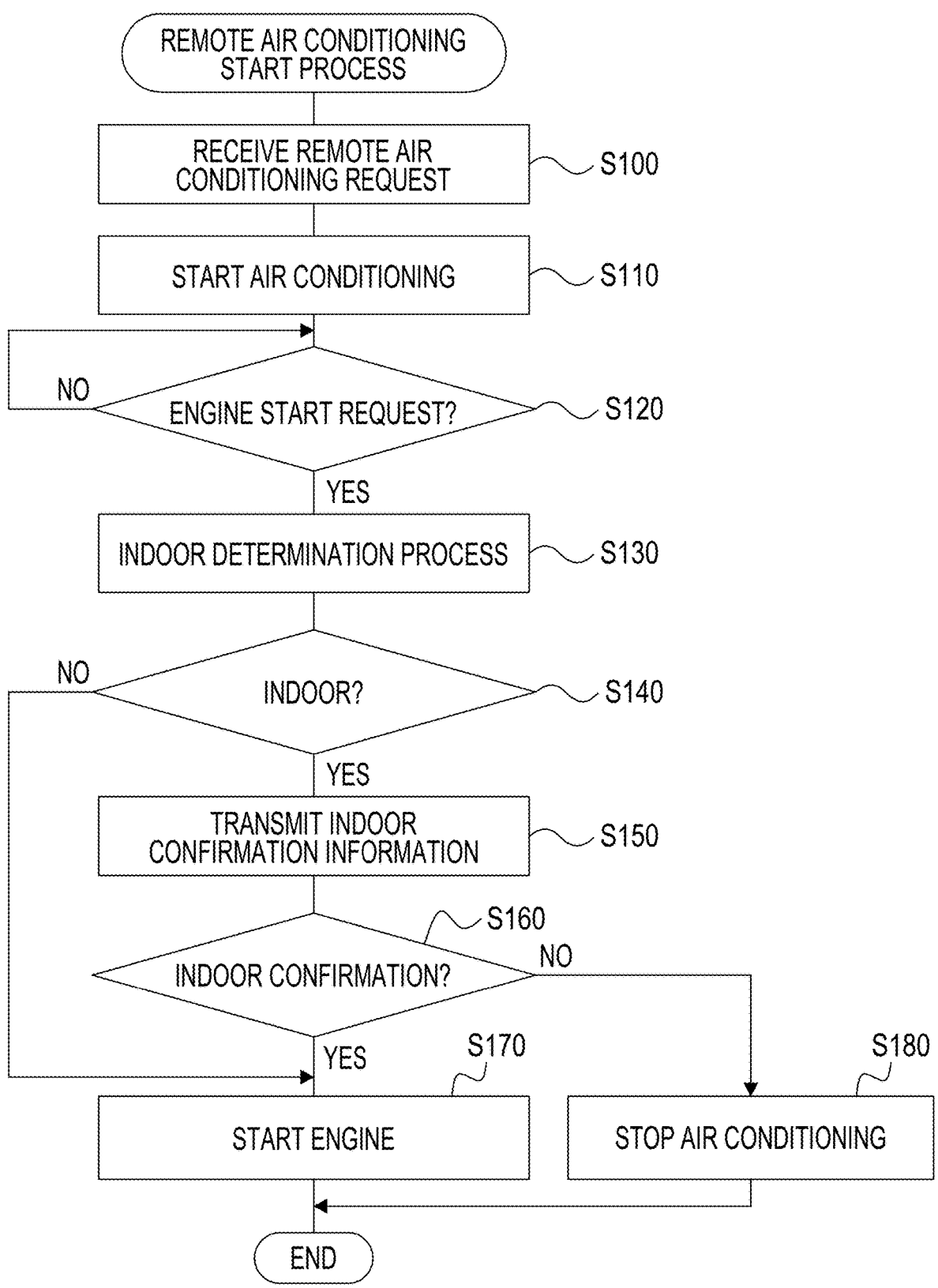
FIG. 3 is a flowchart showing an example of a remote air conditioning start process executed by an electronic control unit 30 of the vehicle 20.

The engine EG by the remote operation is started by the following procedure. First, by activating the air conditioning activation application 130 on the portable terminal 120 and tapping an activation button of the air conditioning device 74 by the remote operation, the user authentication unit 230 of the management center 220 executes the user authentication. When the user authentication is confirmed, an air conditioning activation control signal is transmitted from the air conditioning activation unit 240 of the management center 220 to the electronic control unit 30 of the vehicle 20. The electronic control unit 30 of the vehicle 20 that receives the air conditioning activation control signal activates the air conditioning device 74, and a request to start the engine EG is made due to the need for the air conditioning by the air conditioning device 74. The engine EG is started in response to such a request to start the engine EG. FIG. 3 is a flowchart showing an example of a remote air conditioning start process executed by the electronic control unit 30 of the vehicle 20 when the air conditioning is activated by the remote operation. As described above, the remote air conditioning start process is executed when the air conditioning activation control signal is received from the management center 220.

In the remote air conditioning start process, first, a remote air conditioning request (air conditioning activation control signal) is received (step S100), and the air conditioning by the air conditioning device 74 is started (step S110). Subsequently, the electronic control unit 30 waits for an engine start request (step S140). The driving of the air conditioning device 74 can be started by supplying electric power from the battery (not shown), but when a storage ratio SOC of the battery is decreased and the electric power needed for the air conditioning cannot be obtained, the engine EG is started to drive the air conditioning device 74 by using the electric power obtained by the power of the engine EG. Therefore, when the engine EG is needed to be started, the engine start request is output.

When a determination is made in step S120 that the engine start request is given, a determination process of whether or not the vehicle 20 is parked indoors is executed (step S130). This determination can be executed by determining whether or not a proximity object is present based on the proximity information from the clearance sonar 54, whether or not a degree of sunlight is small during daytime based on the sunlight information from the sunlight sensor 55, whether or not a structure, such as a wall or a shutter, is present based on the recognition of the nearby proximity object by the camera 60, whether or not there is a difference between the outside air temperature from the outside air temperature sensor 56 and a current temperature acquired from a communication network, whether or not the proximity object is present based on the radar information from the millimeter wave radar 61, and whether or not the number of signals captured by the GPS 62 is smaller than usual, and the like. A result of this determination process is determined (step S140), when a determination is made that the vehicle 20 is not parked indoors, the engine EG is started (step S170), and this process is terminated.

When a determination is made in step S140 that the vehicle 20 is parked indoors, the indoor confirmation information is transmitted to the portable terminal 120 via the management center 220 (step S150). Based on the indoor confirmation information, a message, such as "The parking place is different from the usual. Is exhaust ventilation possible?" and buttons ("OK" and "NO" buttons) for inputting the answer of the message are displayed on a screen of the portable terminal 120. The user makes the answer by tapping the answer button. When the user operates the "OK" button for such indoor confirmation, a confirmation is made as "OK" in a confirmation process of step S160, the engine EG is started (step S170), and this process is terminated. On the other hand, when the user operates the "NO" button, a confirmation is made as "NO" in step S160, the driving of the air conditioning device 74 is stopped (step S180), and this process is terminated.

Figure 4:
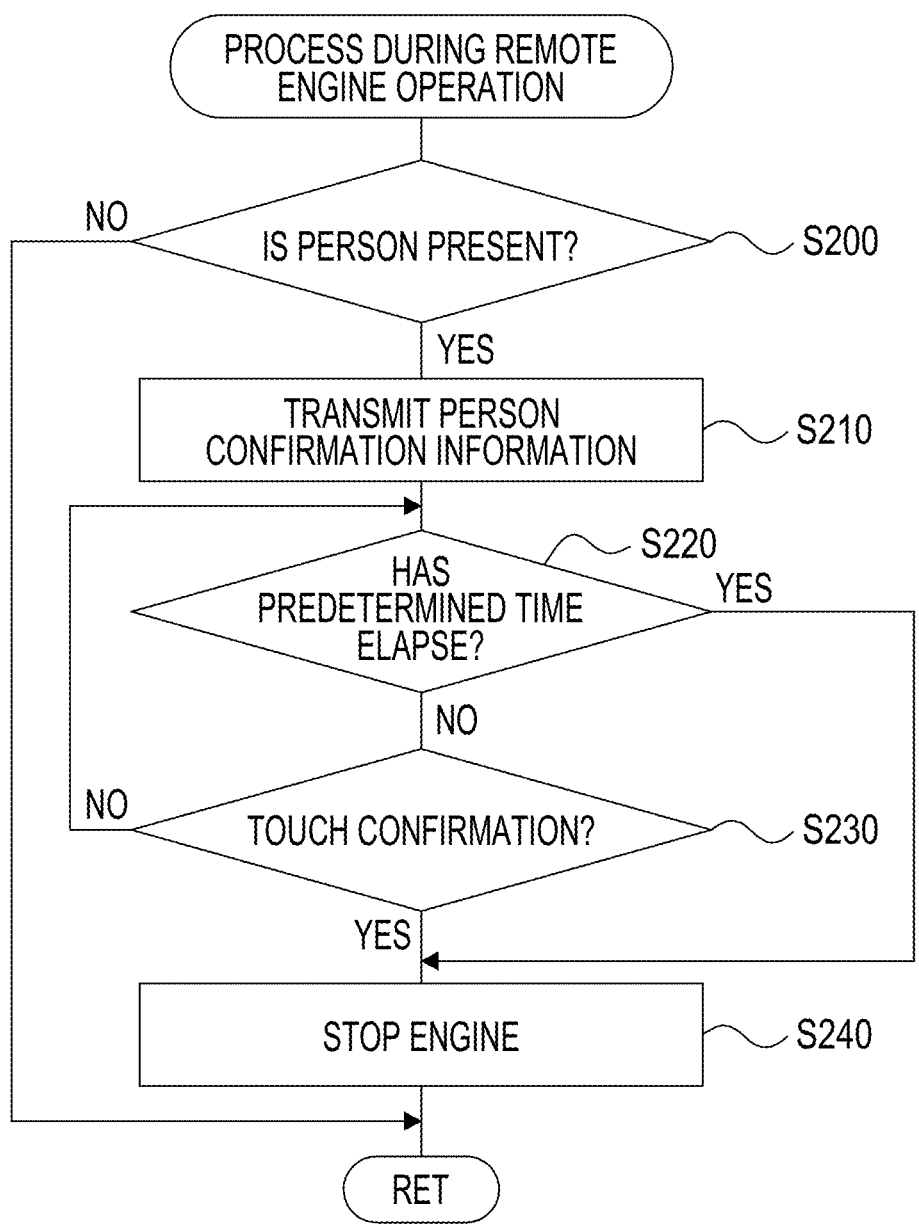
FIG. 4 is a flowchart showing an example of a process during remote engine operation executed by the electronic control unit 30 of the vehicle 20.

Next, the operation after the engine EG is started by the remote operation will be described. FIG. 4 is a flowchart showing an example of a process during remote engine operation executed by the electronic control unit 30 of the vehicle 20.

When the process during remote engine operation is executed, the electronic control unit 30 first determines whether or not the person is present around the vehicle 20 (step S200). This determination is made by determining whether or not the vibration of the vehicle body occurs based on the vehicle body vibration information from the vehicle body vibration sensor 57, whether or not the person is present around the vehicle 20 by the camera 60, and whether or not the voice recognition of the voice of the person is performed. When a determination is made that the person is not present around the vehicle 20, this process is terminated.

When the determination is made in step S200 that the person is present around the vehicle 20, person confirmation information is transmitted to the portable terminal 120 via the management center 220 (step S210). Based on the person confirmation information, a message, such as "The person is present around the vehicle. Please say engine stop", is displayed on a screen of the portable terminal 120. Moreover, when the user inputs the voice of engine stop to the portable terminal 120 before a predetermined time elapses (steps S220, S230), the operation of the engine EG is stopped (step S240), and this process is terminated. Even when the user does not input the voice of engine stop to the portable terminal 120 before a predetermined time elapses (steps S220, S230), the operation of the engine EG is stopped (step S240), and this process is terminated. As described above, by stopping the operation of the engine EG when the determination is made that the person is present around the vehicle 20 while the engine EG is operated, it is possible to suppress the influence of the exhaust on the person around the vehicle.

In the vehicle 20 according to the embodiment described above, in a case where the engine EG is started based on the air conditioning activation by the remote operation, when a determination is made that the vehicle 20 is parked indoors, the remote operator is notified that the vehicle 20 is parked indoors. As a result, it is possible to notify the user (remote operator) that the vehicle is parked indoors. In response to the notification to the user (remote operator) that the vehicle 20 is parked indoors, the user (remote operator) is made to decide whether or not to start the engine EG. As a result, it is possible to suppress the deterioration of the environment indoors or in the occupant cabin due to exhaust.

In addition, in the vehicle 20 according to the embodiment, when a determination is made that the person is present around the vehicle 20 while the engine EG is operated based on the air conditioning activation by the remote operation, the operation of the engine EG is stopped. As a result, it is possible to suppress the influence of the exhaust on the person around the vehicle 20.

As described above, in the vehicle 20 according to the embodiment, in a case where the engine EG is started based on the air conditioning activation by the remote operation, the limitation condition for limiting the engine start is stricter (engine EG is hard to be started) or the stop condition for stopping the engine after the engine EG is started is looser (engine EG is easily stopped), as compared to a case where the engine EG is started based on the driver getting on the vehicle and activating the system. As a result, it is possible to further reduce the risk when the engine EG is started based on the remote operation. As a result, it is possible to take more appropriate measures with respect of the start of the engine EG based on the remote operation.

In the vehicle 20 according to the embodiment, in a case where a determination is made that the vehicle 20 is parked indoors when the engine EG is started based on the air conditioning activation by the remote operation, the remote operator is notified that the vehicle 20 is parked indoors. However, even in a case where a determination is made that the vehicle 20 is parked indoors after the engine EG is started based on the air conditioning activation by the remote operation, the remote operator may be notified that the vehicle 20 is parked indoors. In this case, the operation of the engine EG may be stopped. In this way, it is possible to suppress the deterioration of the environment indoors or in the occupant cabin due to exhaust.

In the vehicle 20 according to the embodiment, measures have been taken when the engine EG is started based on the air conditioning activation by the remote operation or while the engine EG is operated based on the air conditioning activation by the remote operation, but, as long as the engine EG is started based on the remote operation or the engine EG is being operated based on the remote operation, the measures may be taken when the engine EG is started not based on the air conditioning activation or while the engine EG is operated not based on the air conditioning activation.

In the vehicle 20 according to the embodiment, the configuration has been adopted in which the motor MG is attached to the input shaft 23 of the automatic transmission device AT connected to the output shaft 21 of the engine EG via the clutch 22, but a hybrid vehicle having any configuration in which the engine is provided may be adopted, or a vehicle may be adopted in which a traveling motor is not provided and the engine and the transmission are provided.

The correspondence relation between the main elements of the embodiment and the main elements of the disclosure described in the Summary section will be described. In the embodiment, the engine EG corresponds to the "engine", the electronic control unit 30 corresponds to the "controller", and the vehicle 20 corresponds to the "vehicle".

Since the embodiment is an example for specifically describing the mode for carrying out the disclosure described in the Summary section, the correspondence relation between the main elements of the embodiment and the main elements of the disclosure described in the Summary section does not limit the elements of the disclosure described in the Summary section. That is, the interpretation of the disclosure described in the Summary section should be made based on the description of the Summary section, and the embodiment is merely a specific example of the disclosure described in the Summary section.

As described above, the mode for carrying out the present disclosure has been described with the embodiment. However, the present disclosure is not limited to such an embodiment, and various modifications can be made without departing from the gist of the present disclosure.

The present disclosure can be used in the manufacturing industry of the vehicle and the like.

What is claimed is:

1. A vehicle, comprising:
   an engine; and
   a controller configured to start the engine based on a remote operation,
   wherein
   the controller is configured to, in response to (i) receiving the remote operation to start the engine, (ii) determining the vehicle being parked indoors, and (iii) confirming that exhaust ventilation is not possible,
   give a warning that the vehicle is parked indoors, and prohibit the engine from being started, and
   the controller is configured to stop the engine in response to detecting presence of a person around the vehicle while the engine is operated based on the remote operation.

2. The vehicle according to claim 1, further comprising an ambient situation detector configured to detect an ambient situation of the vehicle,
   wherein the controller is configured to determine whether or not the vehicle is parked indoors based on a detection result of the ambient situation detector.

3. The vehicle according to claim 1, wherein the controller is configured to confirm that the exhaust ventilation is not possible by receiving a confirmation from a portable terminal that performs the remote operation.

* * * * *